US012619088B2

(12) United States Patent
Hu et al.

(10) Patent No.: US 12,619,088 B2
(45) Date of Patent: *May 5, 2026

(54) LASER PROJECTOR WITH REDUCED OPTICAL ELEMENTS AND IMPROVED POWER EFFICIENCY

(71) Applicant: QISDA CORPORATION, Taoyuan City (TW)

(72) Inventors: Chun-Hao Hu, Tainan City (TW); Tsung-Hsun Wu, Taoyuan City (TW); Ching-Shuai Huang, Taoyuan City (TW); Ping-Chung Chou, Taichung City (TW)

(73) Assignee: QISDA CORPORATION, Taoyuan City (TW)

( * ) Notice: Subject to any disclaimer, the term of this patent is extended or adjusted under 35 U.S.C. 154(b) by 377 days.

This patent is subject to a terminal disclaimer.

(21) Appl. No.: 18/222,493

(22) Filed: Jul. 17, 2023

(65) Prior Publication Data

US 2024/0004207 A1 Jan. 4, 2024

Related U.S. Application Data

(63) Continuation of application No. 17/191,649, filed on Mar. 3, 2021, now Pat. No. 11,747,636.

(30) Foreign Application Priority Data

Mar. 20, 2020 (CN) .......................... 202010202778.6

(51) Int. Cl.
G02B 27/10 (2006.01)
G02B 26/00 (2006.01)
(Continued)

(52) U.S. Cl.
CPC ....... *G02B 27/1053* (2013.01); *G02B 26/008* (2013.01); *G02B 27/141* (2013.01);
(Continued)

(58) Field of Classification Search
CPC .............. G02B 27/1053; G02B 26/008; G02B 27/141; G02B 27/145; G02B 27/286;
(Continued)

(56) References Cited

U.S. PATENT DOCUMENTS 10,101,647 B2 10/2018 Takagi
11,747,636 B2 * 9/2023 Hu ........................ G02B 27/286
353/99

(Continued)

FOREIGN PATENT DOCUMENTS

JP 2018-138941 A 9/2018

*Primary Examiner* — Magda Cruz
(74) *Attorney, Agent, or Firm* — Winston Hsu

(57) ABSTRACT

A laser projector includes a light combining device, a light splitting system, a plurality of light valves, and a beam combiner. The light combining device is for emitting an illumination beam. The light splitting system is for receiving the illumination beam to generate a plurality of color beams. The plurality of light valves is for receiving and modulating the plurality of color beams to generate modulated color beams. The beam combiner is for combining the modulated color beams to form a full-color image.

20 Claims, 4 Drawing Sheets

(51) Int. Cl.
| | |
|---|---|
| *G02B 27/14* | (2006.01) |
| *G02B 27/28* | (2006.01) |
| *G03B 21/20* | (2006.01) |

(52) U.S. Cl.
CPC ......... *G02B 27/145* (2013.01); *G02B 27/286* (2013.01); *G03B 21/204* (2013.01); *G03B 21/2066* (2013.01)

(58) Field of Classification Search
CPC .............. G03B 21/204; G03B 21/2066; G03B 21/2073; G03B 21/2033; G03B 21/28; G03B 21/2013
USPC .......................................................... 353/99
See application file for complete search history.

(56) References Cited

U.S. PATENT DOCUMENTS

| | | | | |
|---|---|---|---|---|
| 2012/0050693 | A1 | 3/2012 | Yanai | |
| 2015/0362830 | A1* | 12/2015 | Liao ................... | G03B 21/2066 |
| | | | | 353/31 |
| 2017/0168379 | A1* | 6/2017 | Hashizume .......... | G02B 5/3083 |
| 2017/0176844 | A1 | 6/2017 | Aoki | |
| 2018/0246400 | A1* | 8/2018 | Takagi ............... | G03B 21/2066 |
| 2019/0086779 | A1* | 3/2019 | Chang ................. | G02B 27/143 |
| 2019/0227418 | A1 | 7/2019 | Chang | |
| 2020/0310237 | A1* | 10/2020 | Akiyama ................. | F21V 9/08 |
| 2021/0141302 | A1 | 5/2021 | Akiyama | |

* cited by examiner

LASER PROJECTOR WITH REDUCED OPTICAL ELEMENTS AND IMPROVED POWER EFFICIENCY

CROSS REFERENCE TO RELATED APPLICATIONS

This application is a continuation application of U.S. application Ser. No. 17/191,649, filed on Mar. 3, 2021. The content of the application is incorporated herein by reference.

BACKGROUND OF THE INVENTION

1. Field of the Invention

The present invention is related to a laser projector, in particular to a laser projector that can reduce optical elements and improve efficiency.

2. Description of the Prior Art

Projection systems require a high quality light source. While projection systems have traditionally used discharge lamps as a light source, there is now interest in alternative light sources such as lasers. Lasers have several advantageous properties. They emit a high intensity light beam and have a very long operating lifetime.

However, laser projectors generally use blue light laser sources as illumination beams. The illumination beam needs to be converted into beams of other colors by a wavelength conversion device (such as a color wheel partially coated with phosphor or quantum dots), and then combined with the original illumination beam to be the projector light source. The traditional light combining module uses a light splitting system to reflect the illumination beam and then projecting it to the color wheel. The color wheel includes a wavelength conversion material to generate an excited light beam which can directly penetrate the light splitting system. In addition, part of the illumination beam passes through the part of the color wheel without wavelength conversion material, and returns to the beam splitter through a plurality of reflectors. The illumination beam is then reflected by the beam splitter to combine with the excited light beam. The traditional light combining module needs to be equipped with many optical components, which not only greatly add to the hardware cost, but also add to the weight and volume of the product.

SUMMARY OF THE INVENTION

An embodiment provides a laser projector including a light combining device, a light splitting system, a plurality of light valves, and a beam combiner. The light combining device includes a laser light source, a dichroic mirror, only a single reflecting mirror, and a wavelength converter. The laser light source is for providing a first light beam on a first optical path. The dichroic mirror has a surface and is disposed on the first optical path between the laser light source and the reflecting mirror. The surface is for reflecting a first portion of the first light beam. The second portion of the first light beam is allowed to penetrate the dichroic mirror. The reflecting mirror is disposed on the first optical path and is for reflecting the second portion of the first light beam to the surface of the dichroic mirror. The wavelength converter is for receiving the first portion of the first light beam reflected from the surface and emitting a second light beam to the second optical path. The second light beam penetrates the dichroic mirror. The second portion of the first light beam and the second light beam form the illumination beam on the second optical path. The light combining device is for emitting an illumination beam. The light splitting system is disposed on the second optical path for receiving the illumination beam to generate a plurality of color beams. The plurality of light valves is for receiving and modulating the plurality of color beams to generate modulated color beams. The beam combiner is for combining the modulated color beams to form a multi-color image. The dichroic mirror is disposed between the laser light source and the reflecting mirror. The dichroic mirror, the laser light source and the reflecting mirror are aligned in a straight line. The second portion of the first light beam sequentially penetrates the dichroic mirror, being reflected by the reflecting mirror and being reflected by the dichroic mirror to the second optical path. The second portion of the first light beam and the second light beam form the illumination beam on the second optical path.

Another embodiment provides a laser projector including a light combining device, a light splitting system, a plurality of light valves, and a beam combiner. The light combining device includes a laser light source, a dichroic mirror, only a single reflecting mirror, and a wavelength converter. The laser light source is for providing a first light beam on a first optical path. The dichroic mirror is disposed on the first optical path between the laser light source and the reflecting mirror. The dichroic mirror is for reflecting a first portion of the first light beam. The second portion of the first light beam is allowed to penetrate the dichroic mirror. The reflecting mirror is disposed on the first optical path and is for reflecting the second portion of the first light beam to the dichroic mirror. The wavelength converter is for receiving the first portion of the first light beam reflected from the dichroic mirror and emitting a second light beam to the second optical path. The second light beam penetrates the dichroic mirror. The second portion of the first light beam and the second light beam form the illumination beam on the second optical path. The light combining device is for emitting an illumination beam. The light splitting system is disposed on the second optical path for receiving the illumination beam to generate a plurality of color beams. The plurality of light valves is for receiving and modulating the plurality of color beams to generate modulated color beams. The beam combiner is for combining the modulated color beams to form a multi-color image. The dichroic mirror has positive transmittance and reflectance distributed uniformly on the dichroic mirror, and is disposed between the laser light source and the reflecting mirror. The dichroic mirror, the laser light source and the reflecting mirror are aligned in a straight line. The second portion of the first light beam sequentially penetrates the dichroic mirror, being reflected by the reflecting mirror and being reflected by the dichroic mirror to the second optical path. The second portion of the first light beam and the second light beam form the illumination beam on the second optical path.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
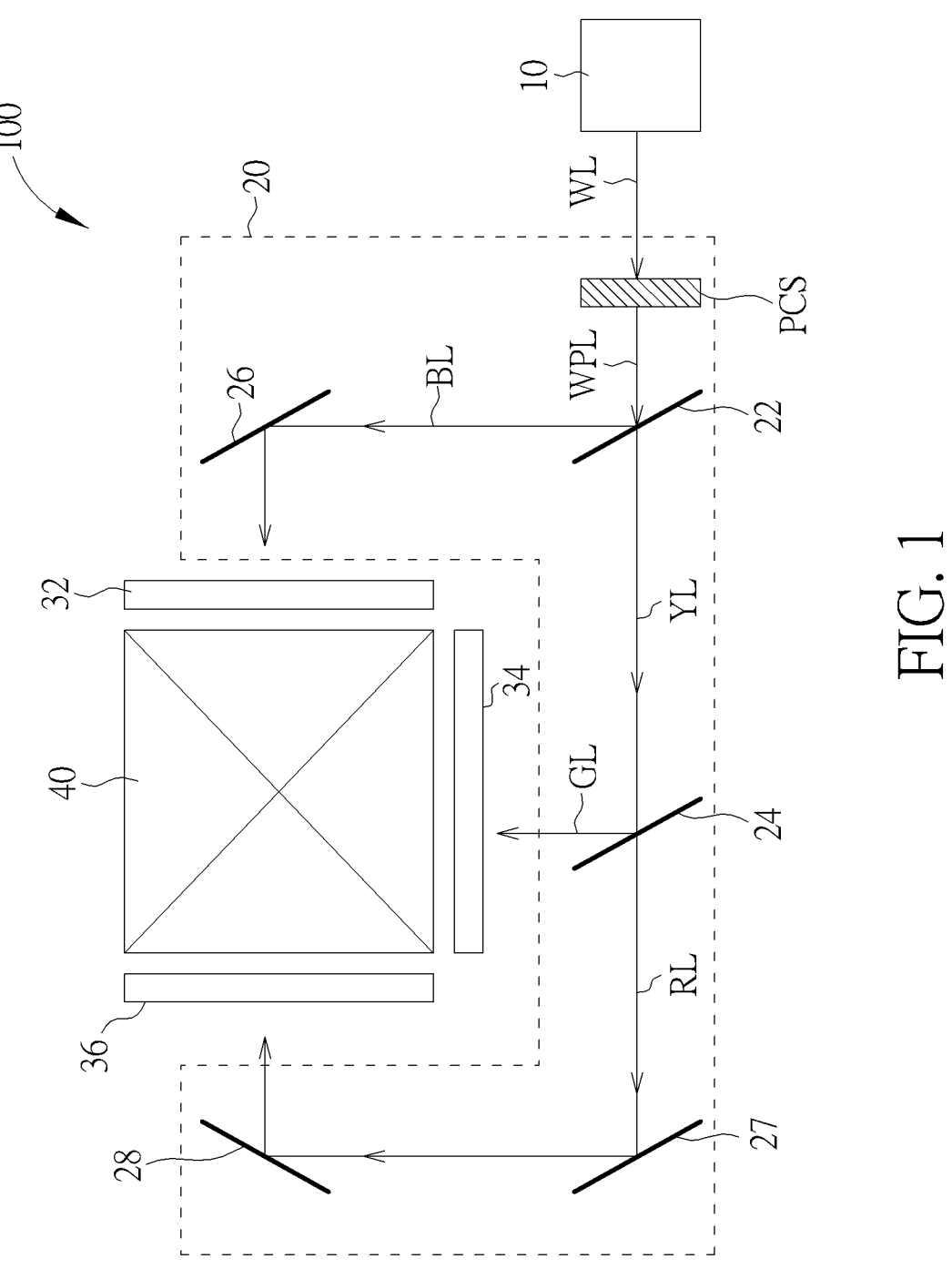
FIG. 1 is a diagram of a laser projector of an embodiment of the present invention.

FIG. 1 is a diagram of a laser projector 100 of an embodiment of the present invention. The laser projector 100 includes a light combining device 10, a light splitting system 20, a plurality of light valves 32, 34, 36, and a beam combiner 40. The light combining device is for emitting an illumination beam WL. The light splitting system is for receiving the illumination beam WL to generate a plurality of color beams, including a blue light beam BL, a yellow light beam YL, a green light beam GL, and a red light beam RL. The first light valve 32 receives and modulates the blue light beam BL. The second light valve 34 receives and modulates the green light beam GL. The third light valve 36 receives and modulates the red light beam RL. The light combiner 40 is for combining the modulated blue light beam BL, green light beam GL, and red light beam RL to form a multi-color image. The light splitting system 20 includes a polarization conversion system PCS to convert the illumination beam WL into a polarized beam WPL. The light splitting system 20 also includes a first dichroic mirror 22, a second dichroic mirror 24, a first reflecting mirror 26, a second reflecting mirror 27 and a third reflecting mirror 28. The light splitting system 20 is for converting the polarized beam WPL to the plurality of color beams and guiding them to the corresponding light valves.

In other words, the optical path of the laser projector 100 of the embodiment can be described as follows. The light combining device 10 emits the illumination beam WL to the polarization conversion system PCS, and the polarization conversion system PCS converts the illumination beam WL to the polarized beam WPL. The polarized beam WPL is then directed to the first dichroic mirror 22. The first dichroic mirror 22 separates the polarized beam WPL into the blue light beam BL and the yellow light beam YL, and guides the yellow light beam YL to the second dichroic mirror 24 and the blue light beam BL to the first reflecting mirror 26. The first reflecting mirror 26 reflects the blue light beam BL to the light valve 32. The second dichroic mirror 24 receives and separates the yellow light beam YL into the green light beam GL and the red light beam RL. The second dichroic mirror 24 reflects the green light beam GL to the second light valve 34. The red light beam RL is reflected sequentially by the second mirror 27 and the third mirror 28 to the third light valve 36. The blue light beam BL, the green light beam GL and the red light beam RL are modulated respectively by the first light valve 32, the second light valve 34 and the third light valve 36. After modulation, each beam is respectively guided to the light combiner 40 and combined to form a multi-color image.

Figure 2:
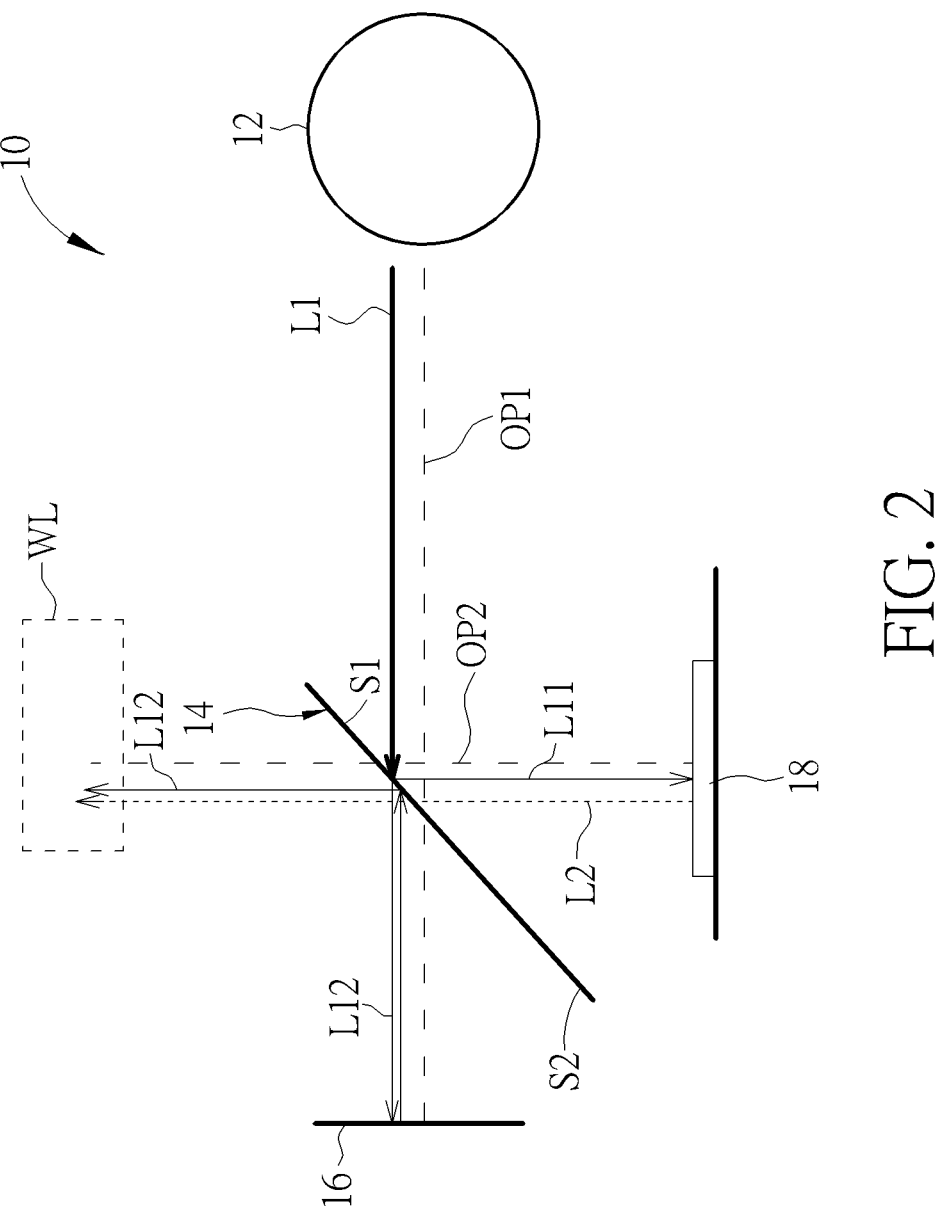
FIG. 2 is a diagram of the light combining device of FIG. 1.

FIG. 2 is a diagram of another embodiment of the light combining device 10 in FIG. 1. The light combining device 10 includes a laser light source 12, a dichroic mirror 14, a reflecting mirror 16, and a wavelength converter 18. The laser light source 12 is used to provide the first light beam L1 on the first optical path OP1. The dichroic mirror 14 has a first surface S1 and a second surface S2, and is disposed on the first optical path OP1 between the laser light source 12 and the reflecting mirror 16. The first surface S1 of the dichroic mirror 14 reflects the first portion L11 of the first light beam L1, and the second portion L12 of the first light beam L1 penetrates the dichroic mirror 14. The reflecting mirror 16 is disposed on the first optical path OP1 perpendicular to the second portion L12 of the first light beam L1 to reflect the second portion L12 of the first light beam L1 to the second surface S2. The second surface S2 then reflects the second portion L12 of the first light beam L1 to the second optical path OP2. The wavelength converter 18 is for receiving the first portion L11 of the first light beam L1 reflected from the first surface and generating the second light beam L2 to the second light path OP2. The second portion L12 of the first light beam L1 and the second light beam L2 form the illumination beam WL on the second optical path OP2. The first light beam L1 can be blue light with a wavelength range from 450 to 475 nm, and the second light beam L2 can be yellow light with a wavelength range from 570 to 590 nm. The dichroic mirror 14 can have different transmittances for light of different wavelengths. In addition, the first optical path OP1 and the second optical path OP2 may be perpendicular to each other, and the angle between the dichroic mirror 14 and the first optical path OP1 may be 45 degrees. This configuration can reduce the lens and other optical elements required by the projector, therefore improving optical efficiency.

In other words, the light path of the light combining device 10 can be described as follows. The laser light source 12 emits a first light beam L1 to the first optical path OP1, the first light beam L1 irradiates the first surface S1 of the dichroic mirror 14 and the first portion L11 of the first light beam L1 is reflected to the wavelength converter 18. The wavelength converter 18 receives the first portion L11 of the first light beam L1 and generates the second light beam L2 to the second light path OP2. The second light beam L2 penetrates the dichroic mirror 14. The second portion L12 of the first light beam L1 also penetrates the dichroic mirror 14 and is reflected by the reflecting mirror 16 to the second surface S2 of the dichroic mirror 14. The second surface S2 then reflects the second portion L12 of the first light beam L1 to the second optical path OP2. The second portion L12 of the first light beam L1 and the second light beam L2 are combined to form the illumination beam WL. The illumination beam WL is then emitted out of the light combining device 10 to be the source illumination beam of the laser projector 100.

Figure 3:
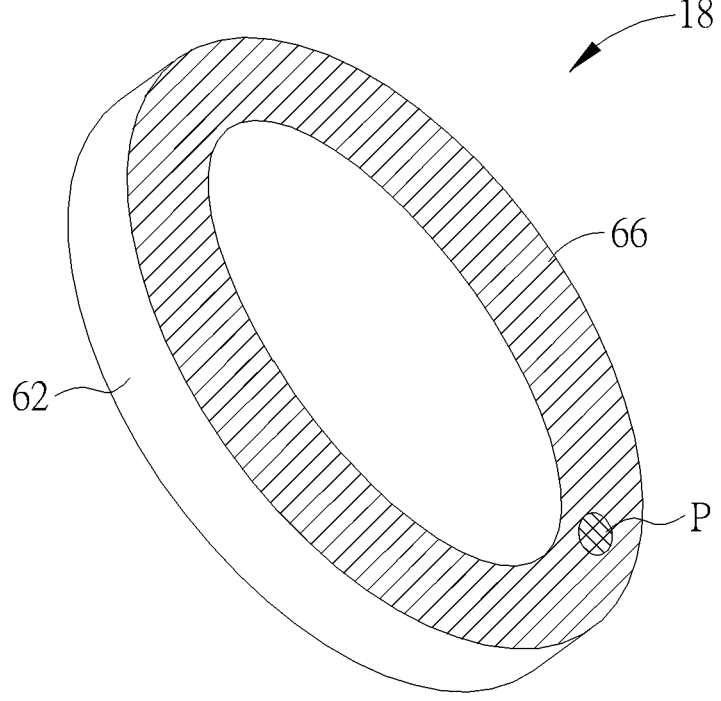
FIG. 3 is a diagram of the wavelength converter in FIG. 2.

FIG. 3 is a diagram of the wavelength converter 18 in FIG. 2. The wavelength converter 18 has a reflective substrate 62. The wavelength conversion coating 66 is coated on the substrate 62 to receive the first portion L11 of the first light beam L1 to generate the second light beam L2. For example, the wavelength conversion coating 66 may be phosphor or quantum dots, which can absorb blue light and generate yellow light by luminescence excitation. In this embodiment, the wavelength converter 18 is a rotatable color wheel, and the disc is made of reflective material. The wavelength conversion coating 66 is a ring-shaped region on the reflective substrate. When the first portion L11 of the first light beam L1 is projected on point P of the high-speed rotating wavelength converter 18, the wavelength conversion coating 66 can be excited to generate the second light beam L2 to the second optical path OP2. The wavelength conversion coating 66 can be consumed uniformly by rotating the wavelength converter 18 at a high speed. Through the aforementioned optical mechanism, the second portion L12 of the first light beam L1 and the excited second light beam L2 can be combined to form the illumination beam WL.

Figure 4:
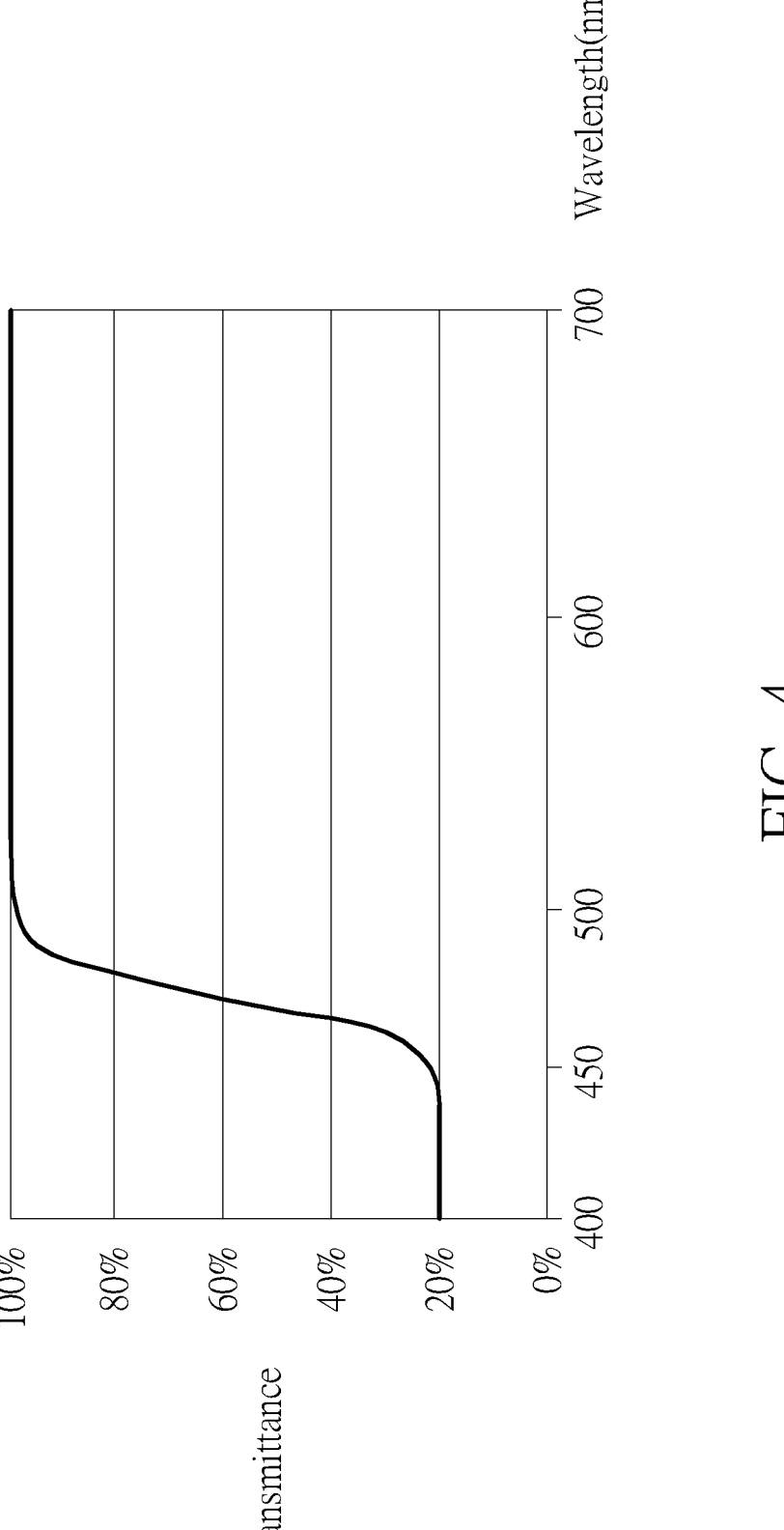
FIG. 4 is a diagram of the wavelength versus the transmittance of the dichroic mirror of FIG. 2.

FIG. 4 is a diagram of the wavelength versus the transmittance of the dichroic mirror 14 in FIG. 2. As the diagram shows, the coating of the dichroic mirror can have almost 100% transmittance for light with wavelength greater than 500 nm, while only about 20% transmittance for light with wavelength below 450 nm. That is, the dichroic mirror 14 can allow about 20% energy of a light beam with wavelength less than or equal to 450 nm to penetrate and reflect about 80% energy of that light beam. The transmittance of light with wavelength from 500 nm to 450 nm gradually decreases in proportion. By implementing this coating characteristic, if the first light beam L1 emitted by the laser light source 12 is a blue light with waveband of 450 nm to 475 nm, a portion of the light beam can penetrate the dichroic mirror 14, and the other portion of the light beam can be reflected by the dichroic mirror 14. If the second light beam L2 generated by the wavelength converter 18 is yellow light with waveband of 570 nm to 590 nm, the second light beam L2 can almost completely penetrate the dichroic mirror 14. This configuration enables the light combining device 10 to combine the blue light beam and the yellow light beam to form the source illumination beam for the laser projector 100.

In summary, various embodiments of the present invention can reduce the lens and other optical elements required by the projector, therefore reducing the hardware cost and reducing the product weight and volume.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A laser projector comprising:
a light combining device configured to emit an illumination beam, the light combining device comprising:
    a laser light source configured to provide a first light beam on a first optical path;
    a dichroic mirror having a surface, the dichroic mirror being disposed on the first optical path, the surface being configured to reflect a first portion of the first light beam, and allow a second portion of the first light beam to penetrate the dichroic mirror;
    only a single reflecting mirror disposed on the first optical path, and configured to reflect the second portion of the first light beam to the surface of the dichroic mirror, the surface of the dichroic mirror reflecting the second portion to a second optical path; and
    a wavelength converter configured to receive the first portion of the first light beam reflected from the surface and to emit a second light beam to the second optical path, the second light beam penetrating the dichroic mirror;
    wherein:
        the dichroic mirror is disposed between the laser light source and the reflecting mirror;
        the dichroic mirror, the laser light source and the reflecting mirror are aligned in a straight line;
        the second portion of the first light beam sequentially penetrates the dichroic mirror, being reflected by the reflecting mirror and being reflected by the dichroic mirror to the second optical path; and
        the second portion of the first light beam and the second light beam form the illumination beam on the second optical path;

a light splitting system disposed on the second optical path, and configured to receive the illumination beam to generate a plurality of color beams;
    a plurality of light valves configured to receive and modulate the plurality of color beams to generate modulated color beams; and
    a beam combiner configured to combine the modulated color beams to form a multi-color image.

2. The laser projector of claim 1, wherein the wavelength converter comprises phosphors or quantum dots.

3. The laser projector of claim 2, wherein the wavelength converter is rotatable.

4. The laser projector of claim 1, wherein the light splitting system comprises a polarization conversion system for converting the illumination beam to a polarized beam.

5. The laser projector of claim 1, wherein the first light beam has a first waveband, the second light beam has a second waveband, and the first waveband is different from the second waveband.

6. The laser projector of claim 5, wherein the first light beam is a blue light beam and the second light beam is a yellow light beam.

7. The laser projector of claim 5, wherein:
the first waveband comprises a first wavelength and a second wavelength different from the first wavelength; and
the first light beam of the first wavelength penetrates the dichroic mirror with a first transmittance and the first light beam of the second wavelength penetrates the dichroic mirror with a second transmittance.

8. The laser projector of claim 7, wherein the first transmittance is different from the second transmittance.

9. The laser projector of claim 1, wherein the first optical path is perpendicular to the second optical path.

10. The laser projector of claim 1, wherein the dichroic mirror and the first optical path intersect at a 45 degree angle.

11. A laser projector comprising:
a light combining device configured to emit an illumination beam, the light combining device comprising:
    a laser light source configured to provide a first light beam on a first optical path;
    a dichroic mirror disposed on the first optical path, and configured to reflect a first portion of the first light beam, and allow a second portion of the first light beam to penetrate the dichroic mirror;
    only a single reflecting mirror disposed on the first optical path, and configured to reflect the second portion of the first light beam to the dichroic mirror, the dichroic mirror reflecting the second portion to a second optical path; and
    a wavelength converter configured to receive the first portion of the first light beam reflected from the dichroic mirror and to emit a second light beam to the second optical path, the second light beam penetrating the dichroic mirror;
    wherein:
        the dichroic mirror has positive transmittance and reflectance distributed uniformly on the dichroic mirror, and is disposed between the laser light source and the reflecting mirror;
        the dichroic mirror, the laser light source and the reflecting mirror are aligned in a straight line;
        the second portion of the first light beam sequentially penetrates the dichroic mirror, being reflected by the reflecting mirror and being reflected by the dichroic mirror to the second optical path; and the second portion of the first light beam and the second light beam form the illumination beam on the second optical path;

a light splitting system disposed on the second optical path, and configured to receive the illumination beam to generate a plurality of color beams;

a plurality of light valves configured to receive and modulate the plurality of color beams to generate modulated color beams; and a beam combiner configured to combine the modulated color beams to form a multi-color image.

12. The laser projector of claim 11, wherein the wavelength converter comprises phosphors or quantum dots.

13. The laser projector of claim 12, wherein the wavelength converter is rotatable.

14. The laser projector of claim 11, wherein the light splitting system comprises a polarization conversion system for converting the illumination beam to a polarized beam.

15. The laser projector of claim 11, wherein the first light beam has a first waveband, the second light beam has a second waveband, and the first waveband is different from the second waveband.

16. The laser projector of claim 15, wherein the first light beam is a blue light beam and the second light beam is a yellow light beam.

17. The laser projector of claim 15, wherein:

the first waveband comprises a first wavelength and a second wavelength different from the first wavelength; and the first light beam of the first wavelength penetrates the dichroic mirror with a first transmittance and the first light beam of the second wavelength penetrates the dichroic mirror with a second transmittance.

18. The laser projector of claim 17, wherein the first transmittance is different from the second transmittance.

19. The laser projector of claim 11, wherein the first optical path is perpendicular to the second optical path.

20. The laser projector of claim 11, wherein the dichroic mirror and the first optical path intersect at a 45 degree angle.

* * * * *